United States Patent [19]

Zaretsky

[11] 3,946,399

[45] Mar. 23, 1976

[54] CHARGE COMPENSATION NETWORK FOR INK JET PRINTER

[75] Inventor: Joseph Zaretsky, Chicago, Ill.

[73] Assignee: A. B. Dick Company, Chicago, Ill.

[22] Filed: Nov. 15, 1974

[21] Appl. No.: 524,037

[52] U.S. Cl. .......... 346/1; 346/75

[51] Int. Cl.$^2$ .......... G01D 18/00

[58] Field of Search .......... 346/75, 1

[56] References Cited

UNITED STATES PATENTS

| | | | |
|---|---|---|---|
| 3,631,511 | 12/1971 | Keur | 346/75 |
| 3,789,422 | 1/1974 | Haskell | 346/75 |
| 3,827,057 | 7/1974 | Bischoff | 346/75 |
| 3,828,354 | 8/1974 | Hilton | 346/75 X |

*Primary Examiner*—Joseph W. Hartary
*Attorney, Agent, or Firm*—Lindenberg, Freilich, Wasserman, Rosen & Fernandez

[57] ABSTRACT

Provision is made for compensating for the effects of the aerodynamic forces and electrostatic forces on a charged ink drop in the vicinity of another charged ink drop or drops by altering the charge applied to the drops affected by these forces so that flight to the intended location of the drop will occur.

15 Claims, 2 Drawing Figures

CHARGE COMPENSATION NETWORK FOR INK JET PRINTER

BACKGROUND OF THE INVENTION

Figure 1:
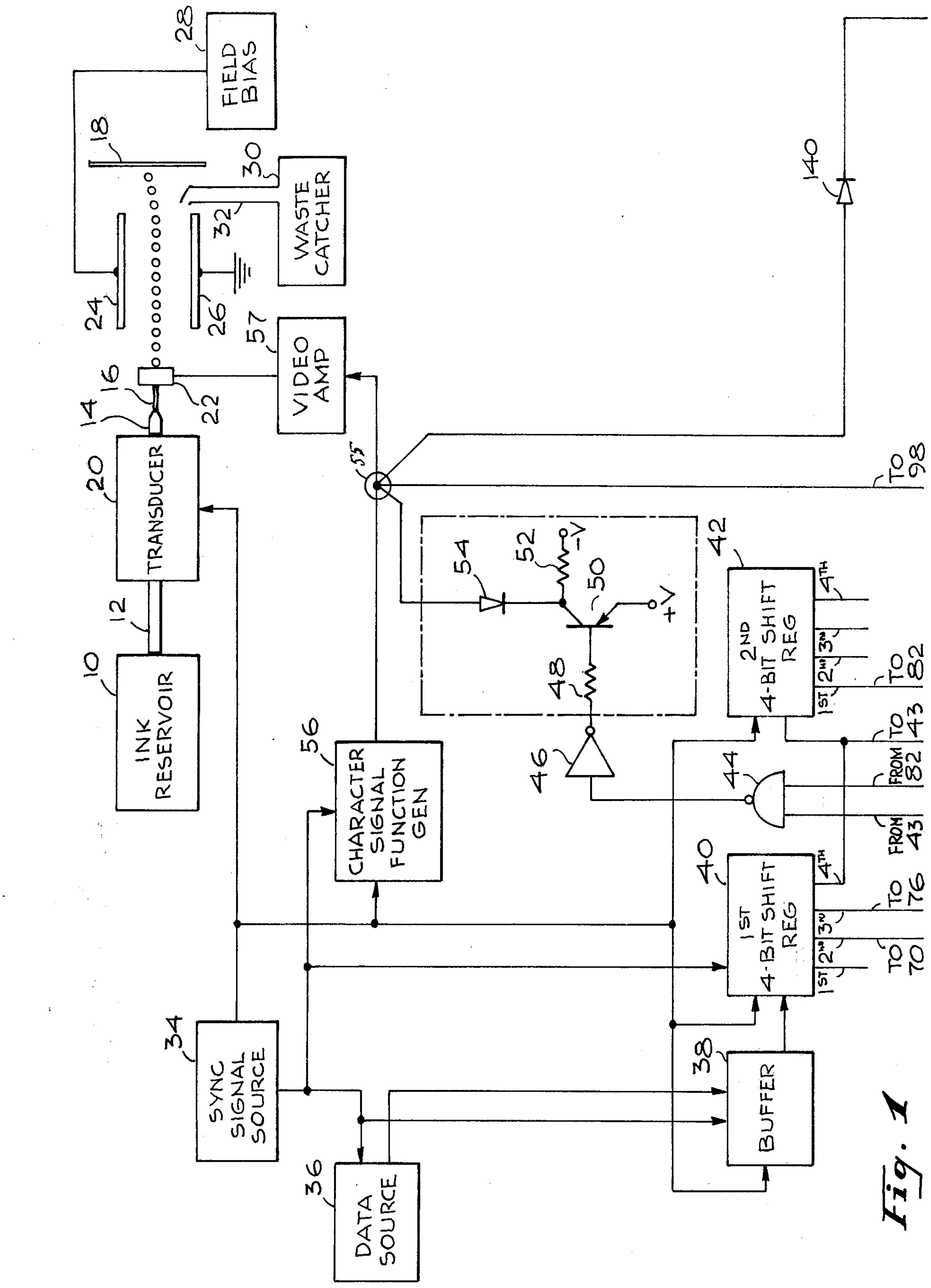

The present invention relates to ink drop printing apparatus and more particularly to an improved arrangement for charging ink drops.

In ink drop printing apparatus, wherein charged ink drops are projected through an electric field in order to be deflected in accordance with the charge on the drop and thereafter fall on paper to form characters or symbols, in order to improve the resulting printing, it has been necessary to compensate both for aerodynamic effects and for the effects of the charges on the drops on each other. The aerodynamic effect is the retardation in the speed of the leading drop in a stream of drops, the leading drop being slowed down by the drag of the air which it must part. The succeeding drops are not affected as much as the first drop. The effect due to a charge on a drop arises, in a stream of drops, where, for example, a first drop in a stream is repelled by the charge on the following drop or drops and is caused to speed up in its passage through the air. The first drop in a stream of two drops will not be repelled nearly as much as the first drop in a stream of more than two drops. The last drop in a stream of drops is effectively pushed away from the stream of drops by the interaction of its charge and the field caused by the charge on the adjacent drop in the stream of drops.

Another problem that arises, when correcting for the repulsive force between the last drop and the drop before the last drop in a stream of charged drops by means of lowering the charge amplitude on the last drop, is that the charged ink drop before the last drop is deflected away from the stream by the interaction of its charge and the field resulting from charges on the adjacent drops in the stream of drops.

Still another problem that arises, which needs solution if excellent ink drop printing is desired, is that the amount of deflection that a single charged drop receives in passing through an electric field is greater than the amount of deflection that a drop, in a stream of drops, which has the same amplitude of charge as the single drop, receives in passing through the same electric field. This is caused by the relatively slower velocity with which a single drop passes through the electric field than does a stream of drops.

Yet another adverse effect has been noted which requires solution. An uncharged drop, not to be used in writing, which follows a stream of charged drops, has a charge induced therein, as a result of the charge on the last charged drop, which is of opposite polarity and of smaller amplitude than the charge on the last charged drop. As a result, this drop may be deflected enough in passing through the electric field, so that it will not be intercepted by the waste catcher and will instead cause ink to accumulate on the deflection plate.

A number of patents have been issued which teach how to provide charge compensation to take care of the effects of the charge of adjacent charged drops. These may be found in U.S. Pat. No. 3,631,511 to Keur, et al, and in U.S. Pat. No. 3,789,422, and U.S. Pat. No. 3,827,057. However, these patents do not teach how one may select the leading drop in a stream of only two drops and in a stream of two or more drops, and the trailing drop in a drop stream for charge compensation, nor do they teach how one may select a single charged drop for charge compensation, or how one may compensate an uncharged drop which immediately follows a charged drop for the effects of the charged drop thereon.

OBJECTS AND SUMMARY OF THE INVENTION

An object of this invention is to provide a charge compensating system for an ink drop printer whereby improved ink drop printing may be achieved.

Yet another object of this invention is to provide a system for compensating the charge on the first drop of a stream of two charged drops and a stream of more than two charged drops as well as the last drops of a stream of charged drops as well as on single charged drops, as well as on an uncharged drop immediately following a charged drop, as well as the drop before the last drop in a stream of charged drops.

The foregoing and other objects of the invention may be achieved in a circuit arrangement wherein there is generated a pulse for each drop that is to be charged, from the circuits which generate the drop charges in response to the character signals which are to be printed by the ink drop system. These pulse signals are passed through shift registers, the outputs of which are connected to logic circuits which determine which is the first and last of these pulses which correspond to the first drop in a stream of two drops and in a stream of more than two drops and last charged drop in a stream of charged drops. Also, logic is provided for deriving from the shift registers information as to when there is a single charged drop. Also, logic is provided for determining, from the shift registers, an occurrence of an uncharged drop following a charged drop. Logic is provided for determining from the shift register which is the drop immediately before the last drop.

Provision is made for suitably attenuating the charge being applied to the first drop of a stream and to the last drop of a stream to compensate for the repulsion forces of the fields of the adjacent charged drops. Provision is made for reducing the charge on a single charged drop so that it will not be over deflected in passing through an electric field. Further, in response to the logic, a charge is applied to an otherwise uncharged drop which follows a charged drop to compensate for the effects of the charge induced therein by the field of the charged drop.

Figure 2:
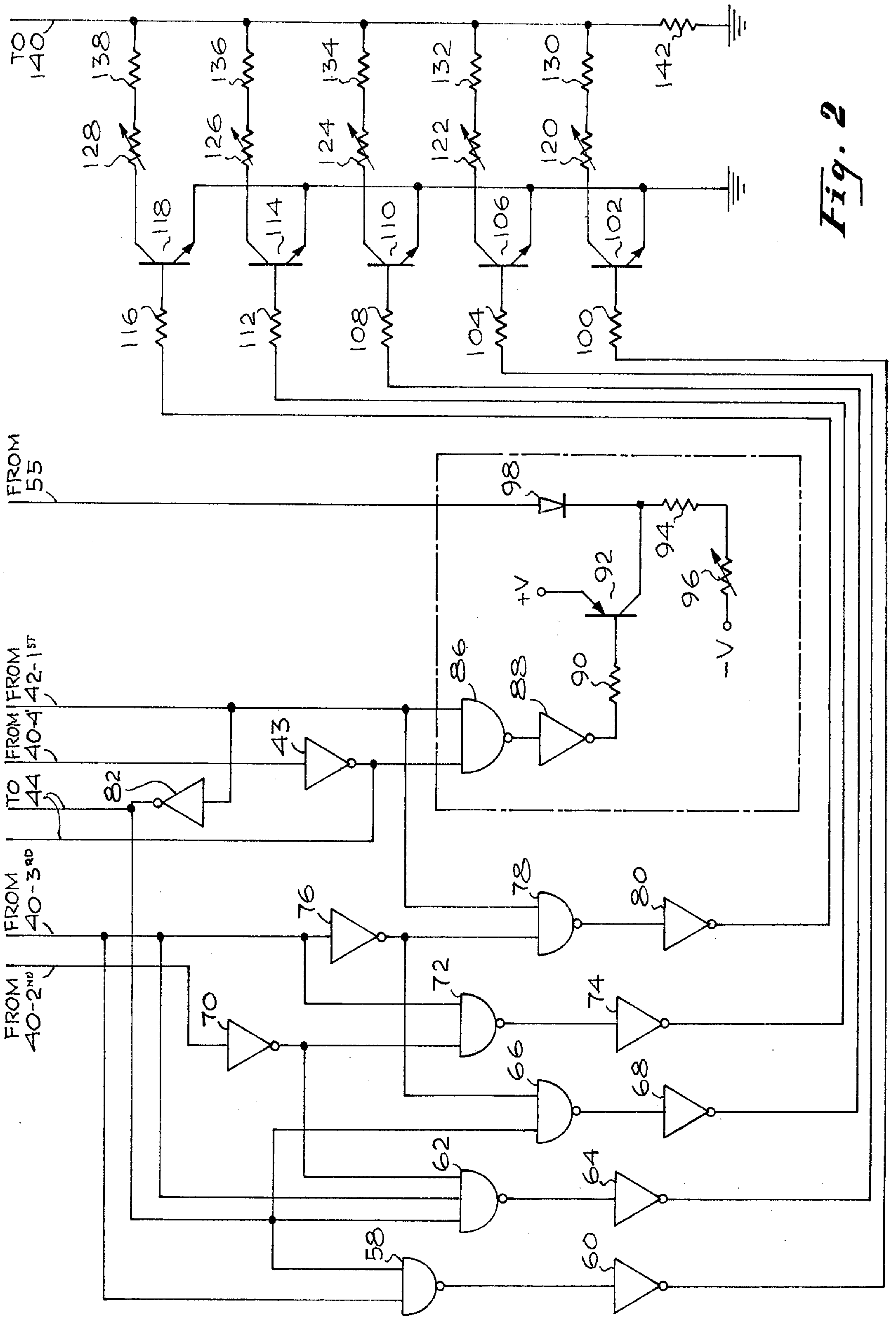

The novel features of the invention are set forth with particularity in the appended claims. The invention will best be understood from the following description when read in conjunction with the accompanying drawings wherein FIGS. 1 and 2 taken together constitute a schematic diagram of an embodiment of the invention.

In the drawings, the presently known ink jet printer is shown schematically, and there is also included a block-schematic representation of the circuitry required in accordance with this invention. The ink jet printer basically includes an ink reservoir 10 which holds ink under pressure. A nozzle 14 is connected to the reservoir 10 through tubing 12 and the ink from the ink reservoir 10 passes through the tubing and nozzle to be in the form of a stream 16, which is directed at a writing medium 18. A transducer 20 which is driven in response to signals from a sync signal source 34, vibrates the ink in the region of the nozzle 14, causing the stream 16, to break up into ink drops at a short distance down stream and at a rate determined by the frequency of vibration. In the region where the stream 16 breaks down into drops, a charging tunnel 22 is provided. The charging tunnel 22 applies a charge to each drop as it is formed.

The amplitude of the charge is determined by the amount of deflection a drop must have to fall at a desired location on paper 18 positioned beyond the field plates 24, 26. A field bias source 28 applies a voltage across the plates 24, 26 to establish an electric field therebetween, through which the drops pass and are deflected in accordance with the amplitude of the charge thereon.

A waste catcher 30, has a deflector 32, which catches those drops which do not have a charge and thereafter drop lower than the charged drops which are deflected upward because of interaction with the field.

The pattern of drops which is written upon the paper 18 is determined by the parallel digital data coming from a data source 36. A character signal function generator 56, in response to pulses from the sync signal source, provides an analog output consisting of a series of electrical pulses, each having a different amplitude. These are applied to a terminal 55 which is connected to the video amplifier 57 and the cathode of diode 54.

In accordance with this invention compensation is provided to handle the ink drop deflection problems, as previously indicated, caused by the fields on these charges, as well as other drop problems which will be indicated. The circuits for accomplishing this include a buffer circuit 38, to which data is applied from the data source at a rate determined by the sync signals from the sync source 40.

The buffer, in response to each character represented by, for example, sixteen bits of parallel digital data will convert this to a number of pulses in series corresponding to the number of drops required to represent that character, however without varying amplitudes being given to these pulses to determine drop placement. The amplitudes are provided by the character generator. These pulses are applied serially to a first shift register 40, in response to the pulses from the sync signal source 34.

The shift register 40, whose function will also be explained subsequently herein, connects its last output to the first input of shift register 42 and through a serially connected inverter 43, NAND gate 44 and inverter 46, to a video gate circuit consisting of resistor 48, connected to the base of a transistor 50. The collector of transistor 50 is connected to a resistor 52 and diode 54.

As will be made more clear subsequently herein, in the absence of pulses in both the last output of the first shift register 40 and the first output of second shift register 42, the video gate circuit will switch off the analog signals applied to junction 55 from the character generator. In the presence of a pulse in either or both the last output of the first shift register and the first output of the second shift register the video gate circuit will not prevent analog signals being applied to junction 55 from being further applied to video amplifier 57. The analog signals applied to the video signal amplifier are made thereby suitable for charging the ink drops.

By way of review, the character signal function generator applies a series of voltage signals to the video amplifier indicative of the amplitudes to be applied to the series of drops which will pass through the charging tunnel 22. For each drop charge signal, the buffer circuit will generate a pulse which is applied to the first four bit shift register 40. The first four bit shift register 40 output is applied to a second four bit shift register 42. The shift registers 40 and 42 are shifted in response to the clock and data sync pulses from the sync signal source. Signals are derived from the shift registers which enable drop charging voltages to be applied to the drops and also in the absence of these signals determine which voltage signals from the character generator are not to be used for drop charging.

The second shifted output from the first four bit shift register 40 is applied to an inverter 70, whose output is applied as one input to two NAND gates 62 and 72.

The third shifted output from the first four bit shift register is applied to an inverter 76 and is one input to the three NAND gates 58, 62 and 72. The output of the inverter 76 is applied as one input to the two NAND gates 66 and 78.

The fourth shifted output from the first four bit shift register is the input to the second four bit shift register and also to inverter 43. The first shifted output of the second four bit shift register 42, is applied to an inverter 82, and then is a second input to NAND gate 78 and one input to NAND gate 86. The output of the inverter 82 is applied as another input to four NAND gates respectively 44, 58, 62 and 66. The output of the five NAND gates respectively 58, 62, 66, 72 and 78 are applied to five inverters respectively 60, 64, 68, 74 and 80. The output of the inverter 60 is applied through a resistor 100 to the base of a transistor 102. The output of the inverter 64 is applied through a resistor 104 to the base of a transistor 106. The output of the inverter 68 is applied by a resistor 108, to the base of a transistor 110.

The output of inverter 74 is applied through a resistor 112 to the base of a transistor 114 and the output of inverter 80 is applied through a resistor 116 to a transistor 118.

The respective emitters of the transistors 102, 106, 110, 114 and 118 are connected to ground. The respective collectors of transistors 102, 106, 110, 114 and 118 are connected to respective potentiometers 120, 122, 124, 126 and 128. The other ends of the respective potentiometers are connected through fixed resistors respectively 130, 132, 134, 136 and 138 to a diode 140, and through a resistor 142 to ground. The anode of diode 140 is connected to the junction 55.

It was previously pointed out that the fourth shifted output of the first four bit shift register 40 is connected to an inverter 43 whose output is connected as one input to each of two NAND gates 44 and 86. The second input to NAND gate 44 is the output of inverter 82. The second input to NAND gate 86 is the first shifted output of the second four bit register 42. The output of NAND gate 86 is connected through an inverter 88 and through a resistor 90 to the base of a P-N-P transistor 92. It was previously pointed out that the output of the NAND gate 44 is applied through inverter 46 and through resistor 48 to the base of the P-N-P transistor 50. The emitters of transistors 92 and 50 are connected to a positive biasing potential shown as +V volts. The collector of transistor 92 is connected to the cathode of a diode 98, whose anode is connected to the junction 55. The collector of transistor 50 is connected to the cathode of the diode 108, whose anode is connected to the junction 55.

The collector of transistor 92 is connected through a serial connected resistor 94 and potentiometer 96, to a −V volt biasing source also.

A description of the operation of the foregoing circuitry is as follows. The purpose of the buffer 38 is to convert parallel data from the output of the data source to serial data as the pulses which are applied to the shift registers and they can then be shifted to the locations which represent the drop position with respect to the charging tunnel. The pattern of pulses in the two shift registers provides a real time simulation of charge and no states of drops in a stream before, during and after passing through the charging plates. A pulse in the first shift register's fourth stage represents the fact that the drop having a corresponding location in the drop stream whose charge-no charge pattern is simulated by the pulse train, is now passing through the charging ring 22. Register stage two of the first shift register holds a signal for a drop, two drop positions before it will pass through the changing plates. Register stage three of the first shift register holds a signal for a drop just before it will pass through the charging plates and register stage 1 of the second shift register holds a signal just after the drop has passed through the charging plate.

STREAM OF CHARGED DROPS — FIRST DROP — LAST DROP

When the first of a series of consecutive pulses, indicative of a stream of consecutively charged ink drops, reaches the fourth shifted output of the first shift register, the third shifted output of the first shift register will be high and the first shifted output of the second shift register will be low. Inverter 82 inverts the low first shifted output of the second shift register so that NAND gate 58 has two high signals applied to its input. Its low output is inverted by inverter 60 applying a high signal to the base of transistor 102. The transistor is rendered conductive in response to the high signal. As a result the analog voltage output of the character function generator at junction 55 will be reduced in value because of the shunt path for this analog voltage established through diode 140, resistor 130, potentiometer 120 and transistor 102, which is in parallel with the load resistor 142. The charge applied to a first drop in a stream of ink drops, is reduced by a value which is set by the shunt path, and is adjustable by virtue of the potentiometer 120.

When the digital signal corresponding in time to the last drop in a series of consecutive drops reaches the fourth shifted output of the first shift register, the third shifted output of the first shift register will be low and the first shifted output of the second shift register will be high. The third shifted output of the first shift register is inverted and made high by inverter 76. As a result the two inputs to NAND gate 78 will be high. The low output of NAND gate 78 is inverted by inverter 80 resulting in a high output being applied to the base of transistor 118. This enables transistor 118 to become conductive whereby a shunt path for the voltage which is being applied to the video amplifier 57 is established, thereby reducing the amplitude of this voltage. As a result the voltage charge applied to the last drop of a series of charged ink drops will be reduced below the value otherwise applied to the ink drops by an amount which can be established by setting of potentiometer 128.

FIRST DROP OF TWO CONSECUTIVE INK DROPS

When the digital signal corresponding in time to the first drop in a series of two consecutive drops to be charged reaches the fourth shifted output of the first register, the third shifted output of the first register will be high and the second shifted output of the first register and the first shifted output of the second register will be low. The second shifted output of the first register is inverted and made high by inverter 70 and the first shifted output of the second register is inverted and made high by inverter 82. As a result the three inputs to NAND gate 62 will be high. The resulting low output of NAND gate 62 is inverted by inverter 64 applying a high signal to the base of transistor 106. The transistor is rendered conductive in response to the high signal, whereby a shunt path is provided for the analog voltage, being applied to video amplifier 57 at that time. As a result, the voltage charge applied to the first drop of a series of two charged ink drops is reduced below the value otherwise applied to the ink drops by an amount which can be established by the setting of potentiometer 116.

A SINGLE DROP

When a digital signal corresponding in time to a single pulse reaches the fourth shifted output of the first shift register, the third shifted output of the first shift register and the first shifted output of the second shift register are low. These outputs are inverted by the respective inverters 76 and 82 whereby two high inputs are applied to the input of NAND gate 66. Its low output is inverted by inverter 68 whereby transistor 110 is rendered conductive at this time. As a result, a shunt path is established for the analog voltage which is amplified by video amplifier 57, thereby the single drop charging voltage amplitude is reduced below the value used to charge drops in a stream, as determined by the setting of potentiometer 124.

DROP BEFORE LAST DROP IN A STREAM OF INK DROPS

When the digital signal corresponding in time to the drop before the last drop in a series of consecutive drops to be charged reaches the fourth shifted output of the first register, the second shifted output of the first register will be low and the third shifted output of the first register will be high. The second shifted output of the first register is inverted by inverter 70 whereby two high inputs are applied to the input of NAND gate 72. Its low output is inverted by inverter 74 whereby transistor 114 is rendered conductive at this time. As a result, a shunt path is established for the analog voltage which is proportional to the charging voltage required for the drop before the last drop, and the amplitude of charging voltage for the single drop is reduced below the value otherwise applied to the ink drop by an amount which can be established by setting of potentiometer 126.

UNCHARGED DROP FOLLOWING A STREAM OF CHARGED DROPS

It was previously indicated that compensation is required for the effects of the charges in a stream of ink drops on the drop following the last ink drop in the stream of charged drops because an opposite charge is induced on this ink drop so that it does not follow the path of the stream of zero charged ink drops. The drop charging circuits are modified to provide an additional drop charging signal following what would otherwise be a last drop charging signal. This additional signal if unaltered would have the same amplitude as the charging signal for a drop following in time the last drop position.

When the last pulse of a series of pulses is shifted to the first shifted pulse output of the second shift register, the fourth shifted pulse output of the first shift register will be low and the first shifted output of the second register will be high. NAND gate 86 receives the high first shifted output of the second register and the inverter 43 renders the fourth shifted output of the first shift register high, as a result of which NAND gate 86 will provide a low output. This low output is inverted by inverter 88 with the resulting high signal being applied to the base of transistor 92. Transistor 92 is maintained nonconductive in the presence of a high signal applied to its base, but is rendered conductive when a low signal is applied to its base.

Diode 98, when transistor 92 is rendered nonconductive, is maintained conductive by virtue of the –V volt biasing potential being applied to its cathode through potentiometer 96 and resistor 94. When diode 98 is conductive, any signal applied to the junction 55 will be attenuated by an amount determined by the setting of potentiometer 96 and the value of resistor 94. Transistor 92 is usually maintained conductive, thereby maintaining diode 98 nonconductive, except in the presence of a pulse in the first shifted output of the second four bit shift register and no pulse in the fourth shifted output of the first shift register. This situation also occurs when the last pulse of a stream of pulses is passing through the shift register. As a result, when this situation arises, the drop following the last charged drop in a stream will receive a charge, which is attenuated in value by an amount sufficient to compensate for the charge on the charged drop which just preceded it in the stream and has the opposite polarity. In this way, the drop following a stream of charged drops, that is normally not charged and would not be caught by the catcher, is now caught by the catcher. Transistor 92 is maintained conductive for all other situations, thus permitting the charging video voltage to be applied to the charging plates unattenuated, except of course for the operations previously described in connection with the first and last charged drops, the drop next to the last drop, the drop following the last drop in a stream of drops and a single charged drop.

Diode 54 also is rendered conductive, due to the bias provided by the –V volts biasing source through resistor 52, whenever transistor 50 is rendered nonconductive. Transistor 50 is maintained nonconductive except when there is no pulse in the fourth shifted output of the first shift register and in the first shifted output of the second shift register. When this occurs, the inputs to NAND gate 44 are both high and its output is low. The inverter 46 renders the output high whereby transistor 50 is biased off and diode 54 is rendered conductive and can attenuate the charging voltage signal being applied to the junction 55. The purpose of the circuit just described is to prevent a charging voltage from being applied to "no charge" drops and to allow the signal required for providing the charging voltage for the drop following the last drop to be charged. Thus, in the absence of pulses in the fourth shifted output of the first register and in the first shifted output of the second register, a situation which occurs when no charge is being applied to a drop, the voltage being applied to junction 55 is shunted and is substantially zero.

By way of example, and not to serve as a limitation on the invention, it has been observed that with a 29 micron nozzle and an ink drop velocity of 570 inches per second it was required to reduce the amplitude of the charging voltage between 4% and 6% for letter sizes up to 0.085 inches. The drop following the last charged drop has a voltage of between 8 to 12% of the preceding ink drop charging voltage applied to it. The amount of reduction to achieve compensation is empirically established for each system by observing the printing and adjusting the indicated potentiometers until the badly deflected drops fall into place on the paper.

While two shift registers are represented in the drawing, a single register can also be used.

There has been described a novel system for compensating drop charges for adverse charge affects.

The embodiments of the invention in which an exclusive property or privilege is claimed are defined as follows:

1. In an ink jet printer of the type wherein a stream of ink drops is projected through a means for charging individual drops responsive to video signals indicative of a desired printout, said stream of ink drops thereafter passing through an electric field to be deflected in accordance with the charges on said drops, thereafter terminating on a receiving substrate, the method of compensating the charge which would otherwise be applied to predetermined drops in a stream of ink drops for the effects of other charges in said stream of drops comprising the steps of generating a train of signals simulating at any given moment, for a given stream of drops, the charge and no charge states which the drops in said stream of drops which have not yet passed through said means for charging will assume after passing through said means for charging, at a time when a predetermined drop is passing through said means for charging, sensing solely from said train of signals when a predetermined drop in a stream of charged drops is passing through said means for charging and producing a modifying signal responsive thereto, and modifying the charge applied to said predetermined drop by said means for charging responsive to said modifying signal.

2. In an ink jet printer of the type wherein a stream of ink drops is projected through a means for applying a charge to individual drops responsive to video signals indicative of a desired printout, said stream of ink drops thereafter passing through an electric field to be deflected in accordance with the charges on said drops, thereafter terminating on a receiving substrate, means for compensating the charge being applied to predetermined drops in a stream of ink drops for the effects of the electric fields established by charged drops as well as for aerodynamic effects comprising, means for stimulating the charge-no charge pattern which a stream of drops will have after passing through said means for applying a charge each time one of the drops in said stream is passing through said means for applying a charge, including means for establishing a representative signal representing each drop to be charged by said charging means, shift register means for establishing first, second, third and fourth representative signal inpsection locations for inspecting representative signals respectively at two intervals before each drop passes through said means for applying a charge, at one interval before a drop passes through said means for applying a charge, during and at one interval after the drop represented is passing through said means for applying a charge to individual drops, and means for passing said representative signals through said representative signal inspection locations in synchronism with drops passing through said means for applying an individual charge, logic means solely responsive to a predetermined pattern of representative signals in said signal inspection locations in said shift register means, for producing a modification signal, and means responsive to said modification signal for modifying the charge being applied to said predetermined drop by said means for applying a charge to compensate for aerodynamic effects or for the effects of the charges on other ink drops.

3. In an ink jet printer as recited in claim 2 wherein said means responsive to said modification signal for modifying the charge being applied to said predetermined drop comprises attenuating means enabled responsive to said modification signal for attenuating the amplitude of the charge being applied by said means for applying a charge to individual drops to compensate for the effects of the charge on adjacent ink drops.

4. In an ink jet printer as recited in claim 2 wherein said logic means includes means responsive to the absence of representative signals in said second third and fourth inspection locations for preventing the application of any charge to a drop passing thru said means for applying a charge at that time.

5. In an ink jet printing system as recited in claim 2 wherein said logic means includes a first NAND gate means for producing, when enabled a modification signal, inverter means coupled between one input to said first NAND gate means and the output of said fourth stage of said shift register means, and means coupling the output of said second stage of said shift register means to a second input to said first NAND gate means, whereby when a representative signal is present in said first stage but is not present in said third stage said first NAND gate means is enabled to produce a modification signal to modify the charge applied to the first drop in a stream of drops to be consecutively charged.

6. In an ink jet printing system as recited in claim 2 wherein said logic means includes a second NAND gate means, inverter means coupling the output of said second shift register stage to one of said NAND gate inputs, and means coupling said fourth shift register stage output to a second input to said second NAND gate whereby when a representative signal is present in said fourth shift register stage but not in said second shift register stage said second NAND gate is enabled to produce a modification signal to modify the charge applied to the last drop in a stream of drops that have been charged.

7. In an ink jet printing system as recited in claim 2 wherein said logic means includes a third NAND gate means, a first inverter means coupling the output of said fourth shift register stage to one input to said third NAND gate, a second inverter means coupling the output of said second shift register stage to a second input to said NAND gate whereby when no representative signals are present in said second and fourth shift register stages said third NAND gate is enabled to produce a modification signal to modify the charge being applied to an isolated drop.

8. In an ink jet printing system as recited in claim 2 wherein said logic means includes a fourth NAND gate means, an inverter coupling the third shift register stage output to one input to said fourth NAND gate means, means coupling the fourth shift register stage output to a second input to said NAND gate whereby in the absence of an output from said third shift register stage and in the presence of an output from said fourth shift register stages, said fourth NAND gate is enabled to produce a modification signal to modify the charge being applied to the drop following a charged drop which otherwise would not receive a charge.

9. In an ink jet printing system as recited in claim 2 wherein said logic means includes a fifth NAND gate means, a first inverter coupling said first shift register stage to said fifth NAND gate means, a second inverter coupling said fourth shift register stage to said fifth NAND gate means, and means connecting the output of said second shift register stage to said fifth NAND gate means, whereby said fifth NAND gate means is enabled to produce a modification signal to modify the charge being applied to the first drop of a two consecutive-charged drop sequence.

10. In an ink jet printing system as recited in claim 2 wherein said logic means includes a sixth NAND gate means, a fifth inverter coupling said first shift register stage output to said sixth NAND gate means, and means coupling said second shift register stage output to said sixth NAND gate means, whereby in the absence of an output from said first shift register stage and in the presence of an output from said second shift register stage said sixth NAND gate means is enabled to produce a modification signal to modify the charge being applied to the drop before the last drop in a stream of charged drops.

11. In an ink jet printer of the type wherein a stream of ink drops is projected through a means for applying a charge to individual drops responsive to video signals indicative of a desired printout, said stream of ink drops thereafter passing through an electric field to be deflected in accordance with the charges on said drops, thereafter terminating on a receiving substrate, means for generating a train of signals simulating the charge and no charge states of drops in a stream of drops which would exist before drops pass through said means for charging and which exists during and after passing through said means for charging, first means for sensing solely from said train of signals when the first drop in a stream of charged drops is passing through said means for charging and producing a first modifying signal responsive thereto, first means responsive to said first modifying signal for modifying the charge applied by said means for charging to the first drop in a stream to compensate for the effects thereon of the charges on the succeeding drops in said stream, second means for sensing solely from said train of signals when the last drop in said stream of charged drops is passing through said means for charging and producing a second modifying signal responsive thereto, second means responsive to said second modifying signal for modifying the charge applied by said means for charging to the last drop in said stream to compensate for the effects thereon of the charges on the other drops in said stream, third means for sensing solely from said train of signals when the next to the last drop in said stream of drops is passing through said means for charging and producing a third modifying signal responsive thereto, and third means responsive to said third modifying signal for modifying the charge applied by said means for charging to said next to the last drop in said stream to compensate for the effects of the charges on the other drops of said stream thereon.

12. In an ink jet printer as recited in claim 11 wherein there is included a fourth means for sensing solely from said train of signals when an uncharged drop follows a charged drop in said stream of drops, and producing a fourth modifying signal responsive thereto, and fourth means responsive to said fourth modifying signal for enabling said means for charging to apply a charge to said uncharged drop to compensate for the charge induced thereon from the charges on the charged drops in said stream.

13. In an ink jet printer as recited in claim 11, wherein there is included fifth means for sensing solely from said train of signals when a single drop to be charged in a stream of uncharged drops is passing through said means for charging and producing a fifth modifying signal responsive thereto, and fifth means responsive to said fifth modifying signal for modifying the charge being applied by said means for charging to said single drop to compensate for over deflection thereof.

14. In an ink jet printer as recited in claim 11 wherein there is included sixth means for sensing solely from said train of signals when the first drop of a sequence of two adjacent drops to be charged is passing through said means for charging and producing a sixth modifying signal responsive thereto, and sixth means responsive to said sixth modifying signal for modifying the charge being applied by said means for charging to said first drop of said sequence of two adjacent drops to compensate for the effects thereon of the charge on the second drop in said sequence.

15. In an ink jet printer as recited in claim 11 wherein there is included seventh means for sensing solely from said train of signals when no charge is to be applied to a drop passing through said means for charging and producing a seventh signal responsive thereto, and seventh means responsive to said seventh signal for preventing any charge being applied by said means for charging.

* * * * *